United States Patent

[11] 3,601,098

[72] Inventor Willibald Kraus
Grebenstein, Germany
[21] Appl. No. 12,936
[22] Filed Feb. 20, 1970
[45] Patented Aug. 24, 1971
[73] Assignee Rheinstahl Wenschel Aktiengesellschaft
Germany
[32] Priority Feb. 25, 1969
[33] Germany
[31] P 19 09 393.7

[54] WATER TUBE BOILER
3 Claims, 3 Drawing Figs.
[52] U.S. Cl. ..................................................... 122/235
[51] Int. Cl. .............................................. F22b 21/00
[50] Field of Search ........................................... 122/235, 322, 333, 367

[56] References Cited
UNITED STATES PATENTS
2,567,695  9/1951  Cox .............................. 122/322 X
3,118,431  1/1964  Banker et al. ................. 122/333
FOREIGN PATENTS
1,163,853  2/1964  Germany ...................... 122/235

Primary Examiner—Kenneth W. Sprague
Attorney—Walter Becker

ABSTRACT: A water tube boiler with circular, rectangular or polygonal cross section, and with two or more cage heating surfaces, each of which comprises vertical pipes or tubes, and upper and lower annular or polygonal headers and/or bends, in which the cage-heating surfaces are coaxially arranged one within the other while flue gas passes in a horizontal direction through narrow high passages or lanes between the cage-heating surfaces and between the outermost cage and the flue gas chamber mantle in circumferential direction of said cages. The arrangement is such that with predetermined dimensional data such as gas flow and pressure loss on the gas side, the geometric dimensions of the lanes passed through by the flue gas are so selected that the ratio of the mutual distance of each two adjacent tubes from adjacent cages in a direction transverse to the flow direction of the flue gas to the pipe or tube diameter is less than 1.5 while the number of the passages or gases passed through in a parallel manner by the flue gas is determined by the flow off of the flue on one or both sides by one or more slots at the circumference or between two or more cages.

Patented Aug. 24, 1971 3,601,098

INVENTOR:
Willibald Kraus
BY

WATER TUBE BOILER

The present invention relates to a water tube boiler having a circular, rectangular or polygonal cross section with two or more cage-heating surfaces. Each of these heating surfaces comprises vertical pipes or tubes and upper and lower annular polygonal headers and/or bends. The said cage-heating surfaces are arranged coaxially one within the other while the flue gas passes horizontally through narrow high passages or lanes between the heating surfaces and between the outermost cage and the flue chamber mantle in circumferential direction of the circular rectangular or polygonal cages.

With water tube boilers of the above-mentioned type, as disclosed in my copending application, Ser. No. 11,438, and filed Feb. 14 or 15, 1970 (based on German Pat. application Ser. No. P 19 07 758.8), the geometry of the passages or lanes between the cages, which cages are passed through by flue gas plays an important role with regard to the heat transfer. It is known that with water tube boilers of the above-mentioned type, the heat transfer coefficient at the same speed of the heat releasing medium will be the greater the narrower the passages or lanes, or in other words the shorter the distance between the pipes or tubes of two adjacent cages or between the outermost cage and the flue chamber mantle.

It is, therefore, an object of the present invention to determine the geometric dimensions of water pipe boilers with vertical cage-heating surfaces in such a way that they can also be employed for large and maximum unit outputs in an economical manner.

This object and other objects and advantages of the invention will appear more clearly from the following specification, in connection with the accompanying drawing, in which.

Figure 1:
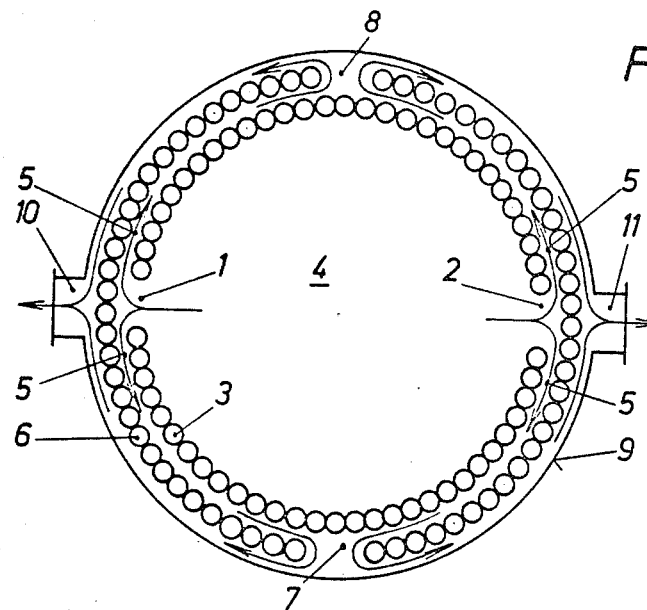
FIG. 1 is a diagrammatic cross section through a water pipe boiler comprising two cages and the flue gas chamber mantle and having four parallel flue gas branch flows.

The above-outlined object has been realized according to the present invention by a water pipe boiler of the above-mentioned general type which is characterized in that with predetermined dimensions such as gas flow, and pressure loss on the gas side, the geometric dimensions of the passages or lanes passed through by flue gas in a parallel way are so selected that the ratio of the distance between any two adjacent cages in a direction transverse to the direction of flow of the flue gases on one hand to the pipe diameter on the other hand is less than 1.5 while the number of the passages or lanes passed through by the flue gas in a parallel manner is determined by the flow-off of the flue gases on one or both sides from one or more slots in the circumference of or between two or more cages.

In conformity with the present invention it is provided that the heat releasing gas flows to the cylindrical chamber confined by the inner cage, axially on one or both sides and then flows in a direction from the inside toward the outside to the flue chamber mantle and from there to the smoke stack, or the heat releasing gas flows into the hollow cylinder between the flue gas chamber mantle and the outer cage and then flows in the direction from the outside toward the inside into the cylindrical chamber confined by the inner cage, and finally flows from the last-mentioned cylindrical chamber in axial direction on one or both sides to the smoke stack.

Referring now to the drawing in detail, the split up into four flue gas branch flows is realized by having the flue gas flow off through two slots 1 and 2 of the inner cage 3 and from the chamber 4 confined by the cage 3 on both sides in the direction of the arrow 5 between the cages 3 and 6. After the flue gas has passed through the two slots 7 and 8 provided in the outer cage 6 it will, in the form of four branch flows, flow between the outer cage 6 and the flue chamber mantle 9 to the discharge openings 10 and 11.

Figure 2:
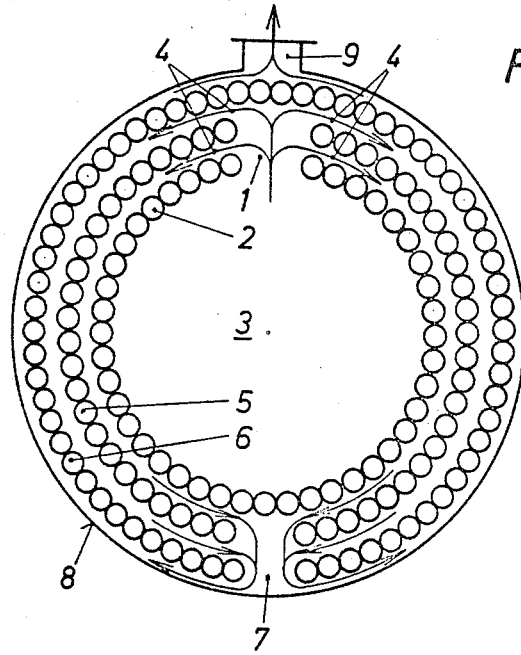
FIG. 2 is a diagrammatic cross section through a water pipe boiler with four parallel flue gas branch flows which comprises three cages and the flue gas chamber mantle.

According to FIG. 2, the split up of the flue gas flow into four branch flows is realized by the fact that the flue gas flows through slot 1 of the inner cage 2 and from the chamber 3 confined by cage 2 on both sides in the direction of the arrow 4 between the three cages 2, 5 and 6 from where it is discharged. In the example according to FIG. 2, two branch flows are obtained after the flue gas has passed through the slot 7 of the outer cage 6 between the latter and the flue gas mantle 8. These two branch flows flow-off through the discharge opening 9.

Figure 3:
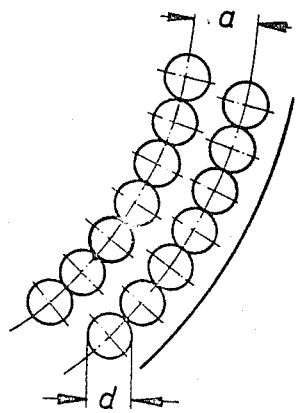
FIG. 3 illustrates a cutout of FIG. 1, but on a larger scale than the latter.

With reference to FIG. 3, it will be noted that with predetermined measurement data such as gas flow and pressure loss on the gas side is so selected that the ratio of the spacing $a$ between the pipes of two adjacent cages measured in a direction transverse to the flow direction of the flue gases, to the pipe diameter $d$ is less than 1.5.

As will be seen from the above, the advantages obtained in conformity with the present invention consist in particular in that a water tube boiler built up on conformity with the present invention may be used as a directly fired boiler with maximum unit steam outputs. Moreover, a water tube boiler built up in conformity with the invention may also be employed as waste heat boiler for large waste gas flows.

It is, of course, to be understood that the present invention is, by no means, limited to the particular showing in the drawing, but also comprises any modifications within the scope of the appended claims.

What I claim is:

1. A water tube boiler having at least two annular heating cages arranged substantially coaxially one within the other and in radially spaced relationship to each other so as to define annular passage means therebetween, each cage comprising vertical pipes peripherally in contact with each other, said boiler also comprising an outer confining wall having outlet means therein and being substantially parallel to the outermost cage while being located in radially spaced relationship thereto so as to define an outer annular passage therebetween, the ratio of the distance $a$ between two adjacent vertical pipes respectively pertaining to two adjacent cages as measured in a direction transverse to the passage between said last-mentioned cages to the diameter $d$ of the said vertical pipes being less than 1.5 according to the equation $a:d<1.5$, the innermost one of said cages being provided with connecting opening means therethrough for permitting flue gas coming up from within said innermost cage to pass through said opening means into the annular passage between said innermost cage and the radially outwardly next following cage whereby the flow of flue gas will split up into branch flows, and the annular passage between said innermost cage and the radially outwardly next following cage communicating with said outlet means.

2. A boiler according to claim 1, in which each of said annular heating cages has two oppositely located connecting opening means therein, the connecting opening means of one cage being offset with regard to the connecting opening means of another cage, and the connecting opening means of the outermost cage being offset with regard to the outlet means in said outer confining wall.

3. A boiler according to claim 1, which includes three heating cages, and in which the innermost and intermediate heating cages have connecting opening means arranged in radial alignment with each other, and in which said intermediate and the outermost heating cages have connecting opening means radially aligned with each other but offset with regard to said outlet means and the first-mentioned connecting opening means of said innermost and intermediate cages.